US006846348B2

(12) United States Patent
Kitchener

(10) Patent No.: US 6,846,348 B2
(45) Date of Patent: Jan. 25, 2005

(54) COMPRESSOR/DRIER SYSTEM AND ABSORBER THEREFOR

(75) Inventor: Anthony John Kitchener, Richmond (AU)

(73) Assignee: Cash Engineering Research Pty Ltd., Richmond (AU)

(*) Notice: Subject to any disclaimer, the term of this patent is extended or adjusted under 35 U.S.C. 154(b) by 44 days.

(21) Appl. No.: 10/257,433

(22) PCT Filed: Apr. 10, 2001

(86) PCT No.: PCT/AU01/00402
§ 371 (c)(1),
(2), (4) Date: Oct. 11, 2002

(87) PCT Pub. No.: WO01/76724
PCT Pub. Date: Oct. 18, 2001

(65) Prior Publication Data
US 2003/0106431 A1 Jun. 12, 2003

(30) Foreign Application Priority Data
Apr. 11, 2000 (AU) .............................................. PQ6829
Sep. 8, 2000 (AU) .............................................. PQ9996

(51) Int. Cl.[7] .............................................. B01D 47/00
(52) U.S. Cl. .................. 95/159; 55/DIG. 17; 95/191; 95/213; 95/214; 95/227; 95/228; 96/234; 96/242; 96/295; 96/296; 261/114.4
(58) Field of Search ............... 55/DIG. 17; 261/114.4; 95/211, 213, 149, 159, 170, 191, 207, 214, 216; 96/234, 242, 200, 270, 271, 272, 273, 322, 295, 296, 290, 371

(56) References Cited

U.S. PATENT DOCUMENTS

| 2,342,419 | A | * | 2/1944 | Henry | 159/47.1 |
| 2,494,644 | A | * | 1/1950 | Clement | 95/122 |
| 2,804,940 | A | * | 9/1957 | Hutchinson | 95/91 |
| 2,955,673 | A | * | 10/1960 | Kennedy et al. | 96/113 |
| 3,170,776 | A | * | 2/1965 | Knight et al. | 96/120 |
| 3,226,948 | A | * | 1/1966 | Alderson et al. | 62/317 |
| 3,958,964 | A | * | 5/1976 | Koch | 96/181 |
| 4,055,403 | A | | 10/1977 | Strauss | |
| 4,375,977 | A | * | 3/1983 | Honerkamp et al. | 96/295 |
| 4,406,589 | A | * | 9/1983 | Tsuchida et al. | 417/295 |
| 4,432,779 | A | * | 2/1984 | Honerkamp et al. | 96/262 |
| 4,455,157 | A | * | 6/1984 | Honerkamp et al. | 96/295 |

(List continued on next page.)

FOREIGN PATENT DOCUMENTS

| DD | 110764 A | 1/1975 |
| JP | 07194931 A | 12/1993 |
| SU | 790412 A | 8/1979 |

OTHER PUBLICATIONS

Copy of International Search Report for PCT/AU01/00402, completed May 16, 2001.

Primary Examiner—Duane S. Smith
(74) Attorney, Agent, or Firm—Alston & Bird LLP

(57) ABSTRACT

A system for delivering dry compressed gas is provided, the gas being separated from any entrained liquid lubricant and then passed through a moisture absorber column to interact with a moisture-removing fluid. The fluid is a liquid lubricant or is maintained in a separate closed circuit relative to the liquid lubricant. A moisture stripping device receives some of the gas from the absorber column, which is passed in moisture exchange relation with the fluid before the fluid enters the column. The column has a housing defining a vertical absorption zone, and partition plates each defining gas flow holes. The plates have at least one tube passing therethrough, with an open upper end above one plate, and a lower end adjacent the next lower plate. The fluid passes down the tubes and across a top surface of each plate, with the gas flow passing upwardly through the holes in the plates.

45 Claims, 5 Drawing Sheets

U.S. PATENT DOCUMENTS

| | | | |
|---|---|---|---|
| 4,550,000 A | | 10/1985 | Bentham |
| 4,553,906 A | * | 11/1985 | Boller et al. ................ 417/295 |
| 4,642,033 A | * | 2/1987 | Boller ........................ 417/295 |
| 5,033,944 A | * | 7/1991 | Lassota .......................... 418/1 |
| 5,053,126 A | * | 10/1991 | Krasnoff .................... 210/188 |
| 5,302,300 A | * | 4/1994 | Porri .......................... 210/774 |
| 5,487,769 A | * | 1/1996 | Hutchinson et al. .......... 55/442 |
| 5,492,461 A | * | 2/1996 | Kitchener et al. ............ 418/85 |
| 5,797,980 A | * | 8/1998 | Fillet ........................... 95/106 |
| 5,993,522 A | * | 11/1999 | Huang ......................... 96/294 |
| 6,156,102 A | * | 12/2000 | Conrad et al. ................ 95/172 |
| 6,267,560 B1 | * | 7/2001 | Charron ....................... 417/53 |
| 6,616,719 B1 | * | 9/2003 | Sun et al. .................. 55/315.2 |
| 2003/0037679 A1 | * | 2/2003 | Kitchener .................... 96/270 |
| 2003/0106431 A1 | * | 6/2003 | Kitchener .................... 95/210 |

* cited by examiner

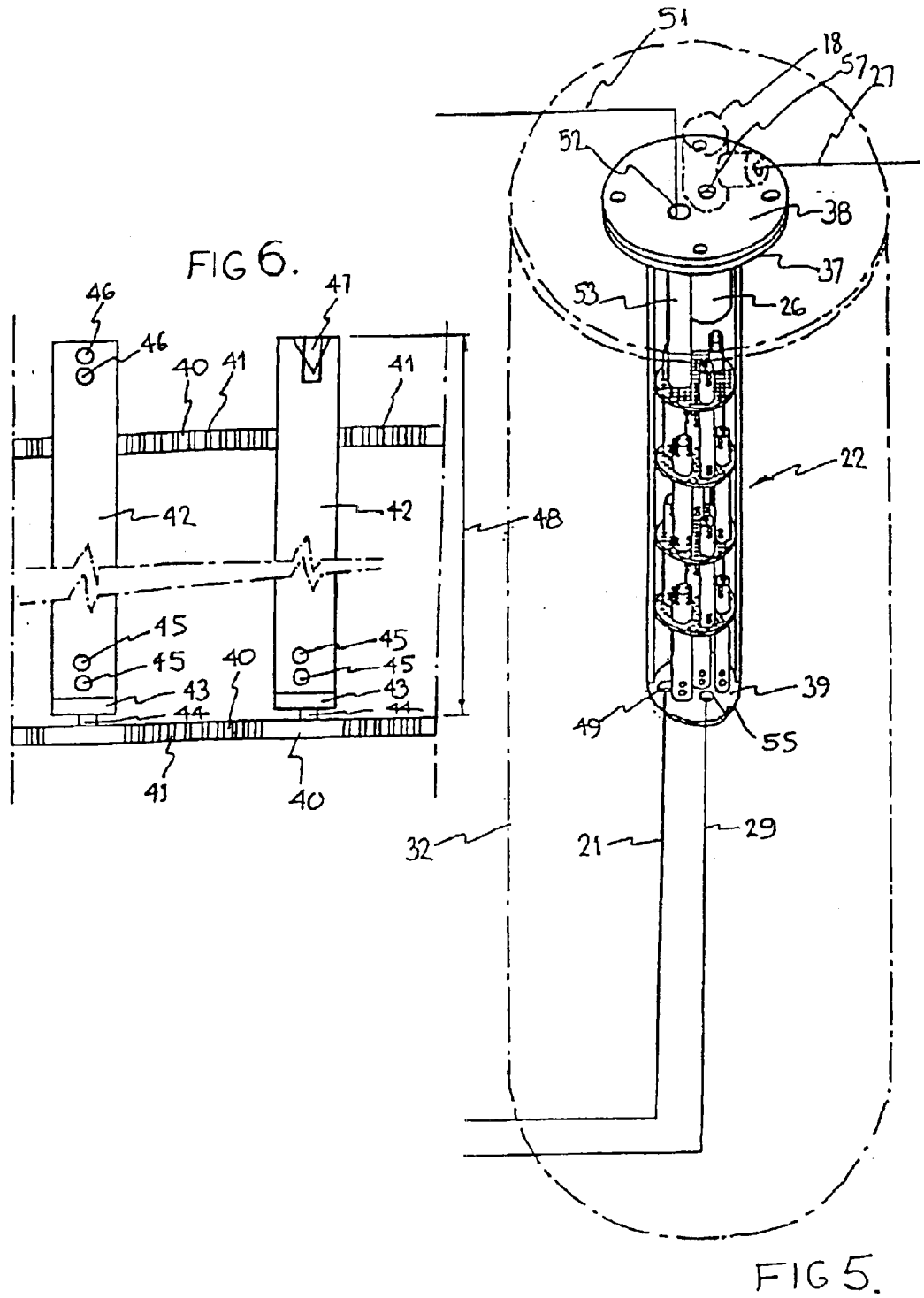

COMPRESSOR/DRIER SYSTEM AND ABSORBER THEREFOR

BACKGROUND OF THE INVENTION

1) Field of the Invention

The present invention relates to improvements in compressor systems adapted to provide clean dry compressed gas, particularly compressed air, at a discharge point therefrom, and an absorber configuration for use in such systems.

2) Description of Related Art

There is increasingly a need to provide moisture free pressurized gas, particularly compressed air, in many industries and applications. Such moisture free compressed gas or air is normally achieved by using separate add on gas drying equipment such as refrigeration driers. Such additional drying equipment is typically expensive to produce, and complicated and costly to operate. The objectives therefore of the present invention are to provide a simplified inexpensive system for producing clear pressurized gas including compressed air and an improved moisture absorber for use in such systems.

BRIEF SUMMARY OF THE INVENTION

Accordingly, the present invention provides in one aspect, a gas compressor system including a driven gas compressor means adapted to receive gas to be compressed and discharge compressed gas therefrom, said discharged compressed gas being delivered to a moisture absorber configured to receive and circulate therethrough a fluid capable of removing moisture from the compressed gas prior to the compressed gas being discharged as a dry compressed gas through filter means to remove any remaining said fluid therefrom, said fluid being circulated through a circuit including a moisture stripping means adapted to receive a portion of the dry compressed gas discharged from the moisture absorber and passing said portion of the dry compressed gas in moisture exchange relationship with said fluid prior to reintroducing said fluid into said moisture absorber, said fluid being heated after leaving said moisture absorber and before entering said moisture stripping means. With such an arrangement the fluid within the circuit need not be particularly hygroscopic in nature but improved performance may be expected if the fluid is in fact hygroscopic in nature, i.e. capable of absorbing or attracting moisture. It has been surprisingly found that by heating the fluid before it enters the moisture stripping means improves overall performance by minimizing the amount of dry compressed gas that needs to be diverted from the dry compressed gas discharge line from the system. Overall efficiency of the system is preferably improved by utilizing waste heat generated by the gas compression means. Alternatively, the fluid may be heated by an independent heater provided to heat the fluid before entering the moisture stripper. Preferably the discharged compressed gas from said gas compressor means is passed initially through a first cooler means to condense at least a portion of the moisture carried by the compressed gas which is collected and removed from the compressed gas flow prior to entering said absorber.

According to a second aspect of this invention, there is provided a gas compressor system including a driven gas compressor means adapted to receive gas to be compressed and discharge compressed gas therefrom, said discharged compressed gas being delivered to a moisture absorber configured to receive and circulate therethrough a fluid capable of removing moisture from the compressed gas prior to the compressed gas being discharged as a dry compressed gas through filter means to remove any remaining said fluid therefrom, said fluid being circulated through a circuit including a moisture stripping means adapted to receive a portion of the dry compressed gas discharged from the moisture absorber and passing said portion of the dry compressed gas in moisture exchange relationship with said fluid prior to reintroducing said fluid into said moisture absorber, said fluid being cooled after leaving said moisture stripping means and before entering said moisture absorber. Again performance is improved if the fluid has hygroscopic characteristics.

In accordance with a further aspect, the present invention also anticipates providing a drier for drying compressed gas, said drier being adapted to receive compressed gas to be dried from a gas compressor means, the compressed gas being delivered to a moisture absorber configured to receive and circulate therethrough a fluid capable of removing moisture from the compressed gas prior to the compressed gas being discharged as a dry compressed gas through filter means to remove any remaining said fluid therefrom, said fluid being circulated through a circuit including a moisture stripping means adapted to receive a portion of the dry compressed gas discharged from the moisture absorber and passing said portion of the dry compressed gas in moisture exchange relationship with said fluid prior to reintroducing said fluid into said moisture absorber, said fluid being heated after leaving said moisture absorber and before entering said moisture stripping means.

In accordance with a still further aspect, the present invention also anticipates providing a drier for drying compressed gas, said drier being adapted to receive compressed gas to be dried from a gas compressor means, the compressed gas being delivered to a moisture absorber configured to receive and circulate therethrough a fluid capable of removing moisture from the compressed gas prior to the compressed gas being discharged as a dry compressed gas through filter means to remove any remaining said fluid therefrom, said fluid being circulated through a circuit including a moisture stripping means adapted to receive a portion of the dry compressed gas discharged from the moisture absorber and passing said portion of the dry compressed gas in moisture exchange relationship with said fluid prior to reintroducing said fluid into said moisture absorber, said fluid being heated after leaving said moisture absorber and before entering said moisture stripping means, said fluid being cooled after leaving said moisture stripping means and before entering said moisture absorber.

According to yet another aspect of this invention, a novel form of moisture absorber column is proposed for use in compressor systems of the above discussed types. According to this aspect, the present invention provides a moisture absorber column including an outer housing defining a vertically disposed absorption zone, a plurality of vertically spaced partition members traversing the absorption zone and each having a plurality of gas flow openings formed therein, at least one conduit member extending through an aperture in each said partition member to have a first portion extending upwardly from the partition member and a second portion extending downwardly towards the next adjacent said partition member located below said partition member, the conduit member having liquid flow means at or adjacent a lower end arranged to allow liquid flow from within the conduit member across the partition member located beneath said conduit member, said absorber column having liquid inlet means arranged to deliver liquid to the uppermost said partition member and liquid outlet means to withdraw liquid from a region below the lowermost said partition member, gas inlet means arranged to deliver gas to the region below the lowermost said partition member whereby said gas flows upwardly through the gas flow openings fanned therein, and gas outlet means arranged to withdraw gas from the absorption zone above the uppermost said partition member. Conveniently, the absorber liquid travels downwardly through the absorption zone as the gas travels upwardly through the absorption zone of the column. The liquid flows initially over or across the uppermost partition member and gas flowing upwardly through the gas flow openings formed therein causes the liquid to bubble or froth upwardly and into the upper ends of the conduit member or members to flow downwardly to the next adjacent partition member below where the process is repeated. In this way maximum contact is established between the gas flow and the liquid flow such that moisture from the gas flow can be collected by the liquid flow to effectively dry the gas flow. In some situations, it may be desirable to maintain a pool of liquid in the absorber through which the gas is bubbled before it reaches the partition members. In this manner, it is ensured that there is always some contact between the liquid and gas, even at start up of the system. Conveniently the pool of liquid is maintained below the lowermost absorber partition member.

In accordance with a still further preferred aspect of this invention, it is proposed to provide a novel module for use in constructing an absorber column as aforesaid. Absorber columns intended for use in gas compressor systems may typically be essentially constructed from an upright cylindrical casing of a relatively small diameter, of the order of 4 to 8 inches. This makes the internal construction of the absorber somewhat difficult and therefore costly. According to this aspect, it is desired to provide a module for use in constructing a moisture absorber column, the module including a partition plate member having a plurality of spaced gas flow openings formed therein, and at least one conduit member extending through an aperture in the partition plate member whereby a first portion extends upwardly from the partition plate member and a second portion extends downwardly below the partition plate member, the second portion having a closed lower end with one or more liquid flow openings located at or adjacent the closed lower end. Modules of this type may simply be positioned, one after the other in a cylindrical outer casing making the construction of same relatively simple. Moreover, the form of construction allows easy adjustment by permitting repositioning of the conduit members relative to the partition plate members to particular applications prior to fixing same into a desired optimum position.

The present invention also anticipates providing a gas compressor system including a driven gas compressor means adapted to receive gas to be compressed and discharge compressed gas therefrom, said discharged compressed gas being passed to a moisture absorber column as described above.

Still further, the present invention also anticipates providing a compressed gas drier including a moisture absorber column as described above adapted to receive compressed gas to be dried from a gas compressor means and deliver said compressed gas to said gas inlet means of the moisture absorber column, said liquid outlet means communicating with a moisture stripping column through which the liquid discharged from said moisture absorber column is passed with moisture picked up by said liquid being at least partially stripped from said liquid by a part of the dry compressed gas flow exiting the gas outlet means of the absorber column being diverted through said moisture stripping column, the liquid after passing through said moisture stripping column being delivered to the liquid inlet means of the moisture absorber column.

BRIEF DESCRIPTION OF THE SEVERAL VIEWS OF THE DRAWINGS

Various preferred embodiments and features of aspects of this invention will become clearer from the following description given in relation to the accompanying drawings, in which:

FIG. 5 illustrates the preferred absorber construction shown in FIG. 3 with a common gas receiver vessel; and FIG. 6 illustrates in partial side view, further features of the preferred absorber construction;

DETAILED DESCRIPTION OF THE INVENTION

Figure 1:
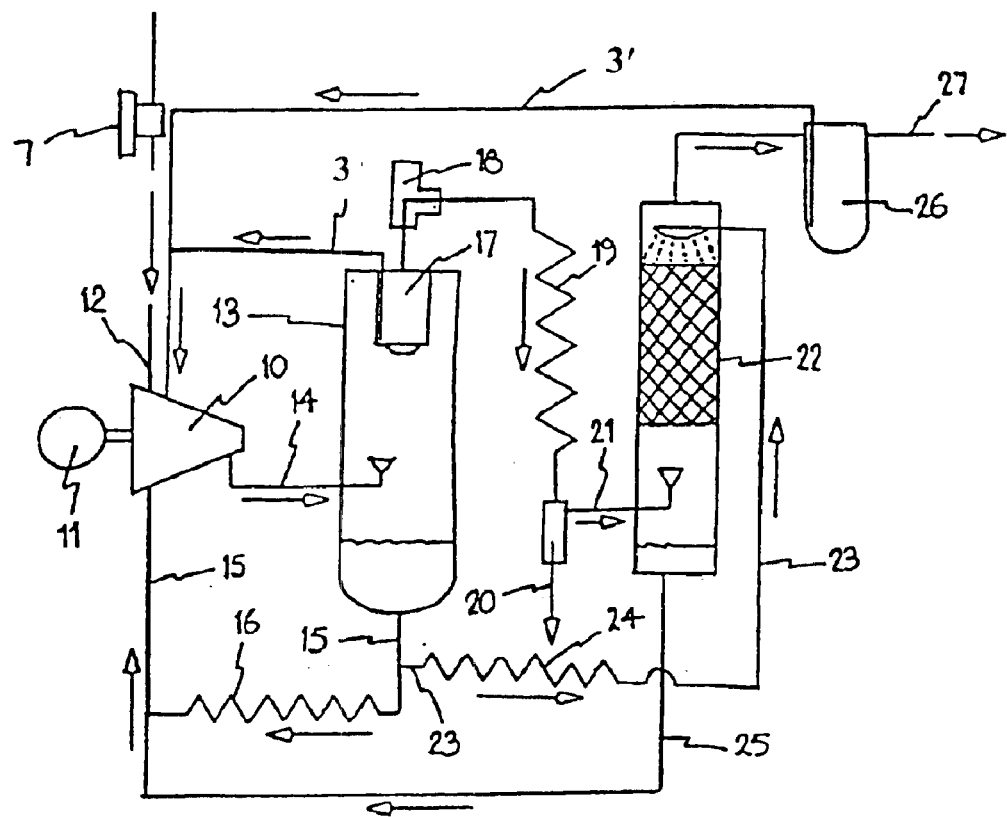
FIG. 1 schematically illustrates a first preferred embodiment of a gas compressor system according to the present invention.

Referring first to FIG. 1, the illustrated compressor system includes a rotary compressor unit 10 driven by a motor 11 which receives a gas (typically air) to be compressed at 12 via an inlet valve 7. The rotary compressor unit 10 may be a screw compressor of any known configuration or in fact any other form of rotary compressor. The system further includes a separator vessel 13 receiving compressed gas and entrained lubricant via line 14 with a preliminary separation of gas and lubricant occurring therein. The lubricant is collected in a lower region of the vessel 13 and returned via line 15 and a lubricant cooler 16 to a lower pressure region of the compressor unit 10. Compressed gas leaves the vessel 13 via a preliminary filter means 17 and a minimum pressure valve 18. The compressor system thus described is essentially conventional in nature and within the context of this invention might be substituted by any other known similar rotary compressor system.

The compressed gas flow leaving the separator vessel 13 is conveniently cooled in a gas cooler device 19 such that at least a portion of the moisture is cooled, condensed, collected and drained away at 20 from the system. The cool humid compressed gas flow is then passed via line 21 to an absorption column 22 where a shower of cool dry hygroscopic fluid is falling. As the compressed gas flow passes upwardly through this shower, moisture is absorbed into the hydroscobic fluid flow conveniently originates via diverting a portion of the lubricant flow in line 15 through a line 23 and thereafter passing same through a further lubricant cooler 24 prior to delivering same to the absorption column 22. In an alternative arrangement the diverted flow might be after the cooler 16 with or without further cooling.

The lubricant falls to the bottom of the absorption column 22 where it is collected and conveniently passed via line 25 back to line 15 or some other lower pressure region of the compressor circuit including the compressor unit 10. This lubricant flow then mixes with the main lubricant flow where it is heated and the absorbed moisture flashes into vapour. This vapour is subsequently condensed in the gas after cooler device 19 and at least partially drained away at 20.

The cool dry compressed gas flow leaving the absorption column 22 passes through a final filter means 26 so that no droplets of coolant can escape with the clean dry compressed gas discharge at 27. Conveniently lubricant purge lines 3,3' are operatively associated with each of the filter means 17 and 26 to return any collected lubricant back to a lower pressure portion of the compressor system such as the compressor unit 10 itself. Further possible changes to the system may include integrating the absorption column 22 into the separator vessel 13 whereby a secondary vessel is not required. Alternatively, the absorption column 22 might be integrated into the air receiver tank as shown in FIG. 5.

Figure 2:
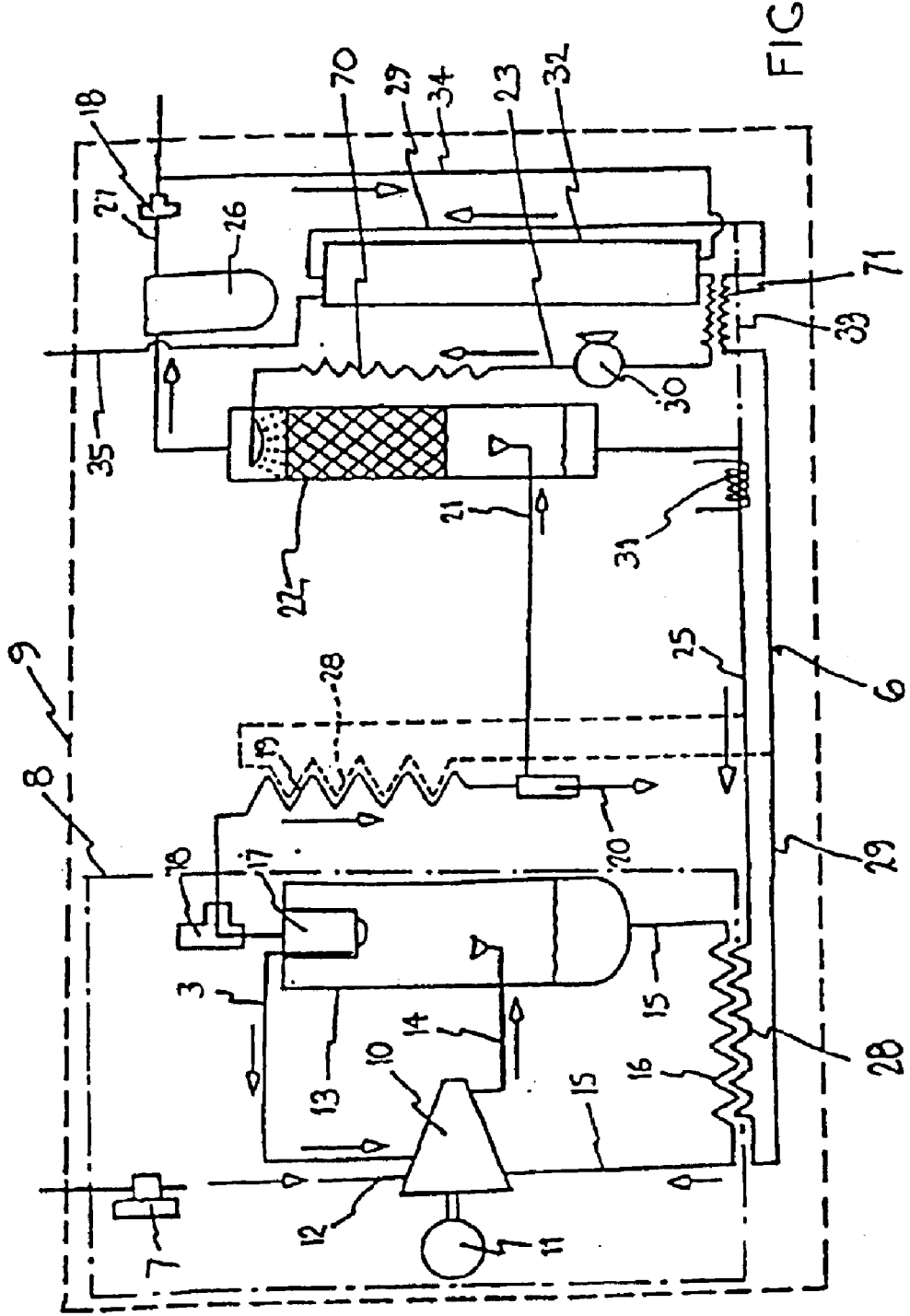
FIGS. 2 and 3 schematically illustrate two further preferred embodiments of similar gas compressor systems.
Figure 3:
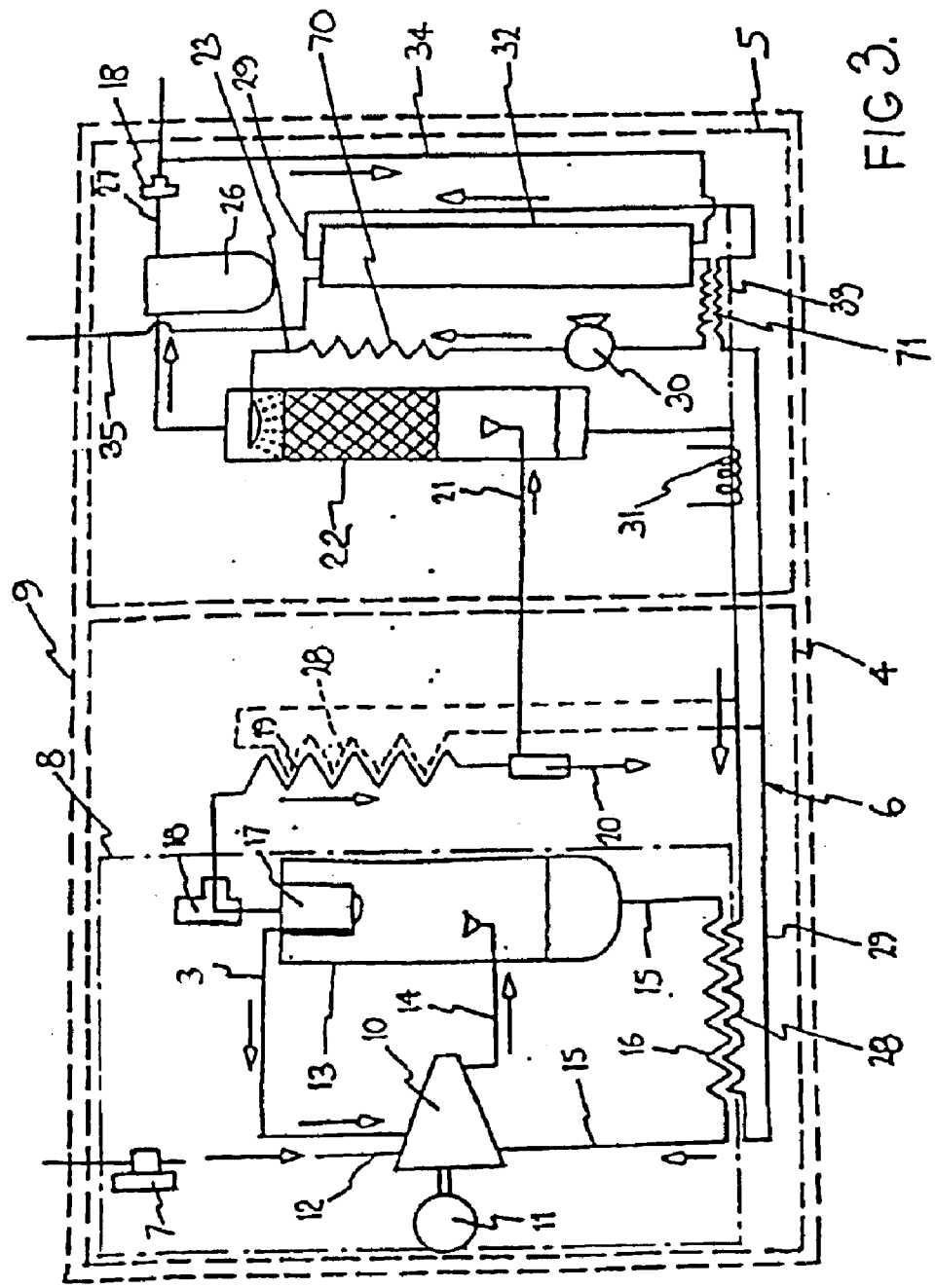

Referring now to FIGS. 2 and 3, there is illustrated a compressor system 9 including a gas compression device 8 which in the illustration is a rotary compressor device similar to that described in the foregoing with reference to FIG. 1. It should, however, be recognised that any other form of gas compressor devices including reciprocating devices could be used.

Similar to the system described with reference to FIG. 1, the compressed gas flow leaving the separator vessel 13 may be conveniently cooled in a gas cooler device 19 such that at least a portion of the moisture contained within the gas is cooled, condensed, collected and drained away at 20 from the system. The cool humid compressed gas flow is then passed via line 21 to an absorber column 22, preferably in the form of an upright column where a shower of cool dry hygroscopic fluid is falling. As the compressed gas flow passes upwardly through this shower, moisture is absorbed into the hygroscopic fluid flow. It should be appreciated that any other form of absorber might be used.

The lubricant falls to the bottom of the absorber column 22 where it is collected and conveniently passed via line 25 in a closed circuit 6 back to the absorber column 22 via a heat exchanger 28 and line 29. The heat exchanger 28 may take up heat from the returning hot lubricant in line 15 from the separator vessel 13. Alternatively, an electric coil 31 might be used to heat the liquid in the aforementioned closed circuit. A still further alternative may be to use heat from the exiting compressed gas in the cooler 19 as shown in dashed outline. Such heating of the fluid conveniently minimizes the amount of dry compressed gas that needs to be diverted from the dry compressed gas discharge line as described hereinafter.

The cool dry compressed gas flow leaving the absorber column 22 passes through a final filter means 26 so that no droplets of absorber liquid can escape with the clean dry compressed gas discharge at 27 possibly to a gas/air receiver tank. Conveniently a lubricant purge line 3 is operatively associated with the filter means 17 to return any collected lubricant back to a lower pressure portion of the compressor system such as the compressor unit 10 itself. Further possible changes to the system may include integrating the absorber column 22 into the separator vessel 13 whereby a secondary vessel is not required. Alternatively, the absorber column 22 might be integrated into the air receiver tank 32 as shown in FIG. 5.

The compressor system of FIG. 3 is essentially similar to that of FIG. 2 except that in FIG. 2 the compressor system 9 is constructed as a common support platform 9 whereas in FIG. 3, the absorber may be constructed as a support platform 5 different to the support platform 4 of the compressor 8 thus providing a separate gas drier assembly.

In FIGS. 2 and 3 a moisture stripper 32, preferably in the form of a column, is provided cooperatively working with the absorber column 22. Fluid exiting from the column 22 may pass via line 25 through the heat exchanger 28 or, in an alternative embodiment may pass via line 33, to the moisture stripper column 32. A portion of dry compressed gas may be taken from the discharge line 27 and delivered via line 34 to the stripper column 32 such that it may pass in contact with the fluid in the circuit 6 after it has left the absorber column 22 where it has picked up moisture. The dry air or gas delivered to the stripper column 32 effectively dries the fluid passing through the stripper column 32 before it enters the absorber column 22. Moisture picked up by the gas/air passing through the stripper column is discharged via line 35 as vapour. Diverting dry compressed gas from the discharge line 27 in this way provides an inefficiency in the system and therefore it is desirable to minimize the amount of dry gas diverted from the line 27. Liquid moisture absorber medium entering the absorber 22 should be cool for proper operation and accordingly, a cooler 70 may be provided in the line 23 following the pump 30 leading to the absorber 22. The pump 30 may be any known type including electrically driven or air driven pumps utilizing compressed air from the discharge 27. As a possible alternative to the cooler 70, a heat exchanger 71 may be provided between the line 23 and the line 29.

With arrangements as illustrated in FIGS. 2 and 3, the liquid within the substantially closed circuit 6 need not be particularly hygroscopic in nature but improved performance may be achieved if it was hygroscopic in nature. Glycol based fluids may be suitable for this application including glycol based lubricants such as Ingersoll Rand's ULTRA™ type coolant and Kluber-Summit's SUPRA™ type coolant.

Figure 4:
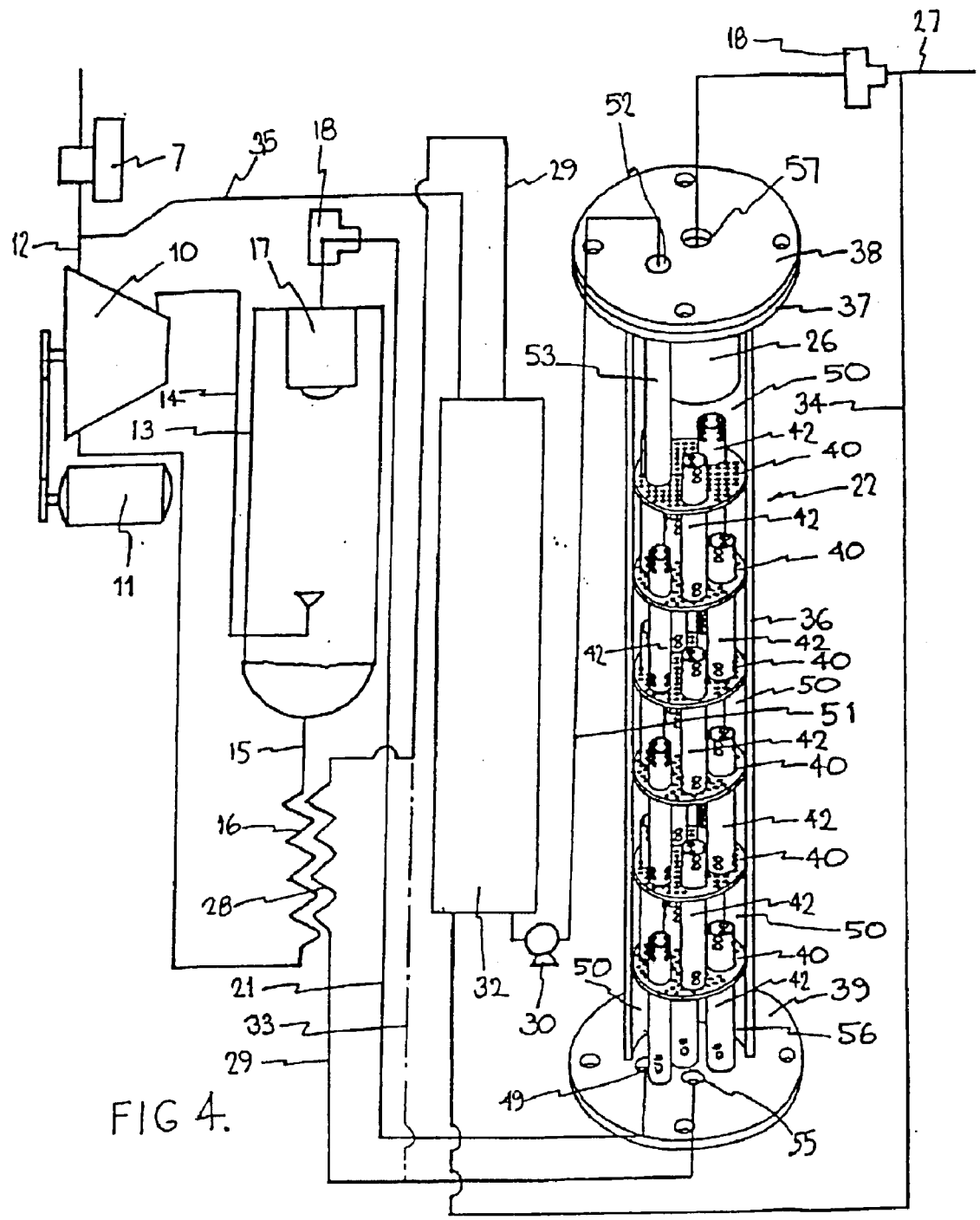
FIG. 4 illustrates a still further embodiment of a gas compressor system while also illustrating features of a preferred absorber construction.

FIG. 4 illustrates a preferred construction of absorber for use in compressor systems as described above, or in fact for any other application. The compressor system 9 is similar in nature to that shown in FIGS. 1 and 2 except that the preliminary cooler 19 has been omitted and the line 35 is directed to the inlet gas flow 12 to the compressor 10. Like features in the earlier embodiments have been given the same reference numerals in FIG. 4.

The absorber column 22 has an outer upright cylindrical shell or casing 36 closed at an upper end by plates 37, 38 and at a lower end by plate 39. Located within the outer casing 36 are a plurality of plates 40 each with a plurality of small gas flow holes 41 in a predetermined array. The plates 40 each have three vertical tubes 42 or conduits passed through apertures in the plates 40 such that the position of the tubes 42 can be adjusted relative to the plates prior to being fixed in an adjusted position. As best seen in FIG. 6, the tubes 42 are closed at the bottom by end caps 43 each having a reduced foot portion 44 to allow liquid flow around the foot portion. It will of course be appreciated that, depending on performance requirements, the number of tubes 42 per plate 40 can be varied depending on allowed space. Each tube 42 has at least one opening 45 adjacent the lower end caps 43 as well as at least one reduced volume flow opening adjacent their upper edges. The reduced volume flow openings may be one or more apertures 46 or notches 47 as illustrated in FIG. 6. To enable an absorber column to be built of any desired capacity, a selected number of modules 48 consisting of a plate 40 and one or more tubes 42 can be stacked one on another within an outer cylindrical casing of desired length. Compressed gas may enter the absorber column 22 via line 21 and a port 49 in the lower end plate 39. The gas essentially travels upwardly through the absorption zone 50 within the casing 36 by passing successively through the holes 41.

Dry liquid is delivered, as shown in FIGS. 4 and 5, via line 51 from the pump 30 to a port 52 in the upper end plates 38, 37. The liquid travels down the tube 53 in the absorber column 22 to be discharged onto the uppermost plate 40. Gas travelling up through the holes 41 (as shown in FIG. 6) in this plate causes the liquid to bubble or froth up and flow eventually into the upper ends of the tubes 42 to flow down these tubes to the next lower plate 40. This process is repeated in a cascade fashion until the liquid is collected in the lower chamber 56 and discharged therefrom via a port 55 in the lower plate 39 to line 29 or lines 29, 33 returning to the moisture stripper 32. In some applications it may be desired to keep a pool of liquid in the lower chamber 56 so that gas entering this chamber must pass through the liquid before reaching the lowermost plate 40. Compressed gas leaving the absorber 22 may conveniently pass through a coalescent type final filter means to remove any liquid picked up via the drying process in the absorber. The filter means 26 may be mounted from one of the plates 37, 38 to be positioned within the absorber. In some applications, a minimum pressure valve (mpv) 18 may be provided mounted to the gas outlet port 57 (FIG. 4) or be separated therefrom (FIG. 3).

The claims defining the invention are as follows:

1. A moisture absorber column including an outer housing defining a vertically-disposed moisture absorption zone for absorbing moisture from a gas, a plurality of vertically-spaced partition members traversing the moisture absorption zone and each having a plurality of gas flow openings formed therein, at least one conduit member extending through an aperture in each said partition member to have a first portion extending upwardly from the partition member and a second portion extending downwardly towards the next adjacent said partition member located below said partition member, the conduit member having a liquid flow control device at or adjacent a lower end arranged to allow liquid flow from within the conduit member across the partition member located beneath said conduit member, said moisture absorber column having a liquid inlet arranged to deliver liquid to the uppermost said partition member and a liquid outlet to withdraw liquid from a region below the lowermost said partition member, a gas inlet arranged to deliver the gas to a liquid retaining zone provided within said moisture absorption zone through which the gas must pass when flowing through said moisture absorption zone to the region below the lowermost said partition member whereby said gas flows upwardly through the gas flow openings formed therein, and a gas outlet arranged to withdraw the gas from the moisture absorption zone above the uppermost said partition member.

2. A moisture absorber column according to claim 1 wherein the liquid retaining zone is located beneath the lowermost partition member.

3. A moisture absorber column according to claim 1 wherein at least three said conduit members are provided extending through each said partition member.

4. A moisture absorber column according to claim 1 wherein the lower end of each said conduit member is closed.

5. A moisture absorber column according to claim 4 wherein said liquid flow control device includes at least one liquid flow opening formed through each said conduit member adjacent the closed lower end.

6. A moisture absorber column according to claim 4 wherein the lower end of each said conduit member engages the next adjacent said partition member located below the partition member through which the conduit member passes.

7. A moisture absorber column according to claim 6 wherein the lower end of each said conduit member is supported on a reduced area zone or zones whereby liquid can flow underneath the lower end or ends.

8. A moisture absorber column according to claim 1 wherein a reduced volume flow zone is formed at or adjacent an upper end of the or each said conduit member.

9. A moisture absorber column according to claim 8 wherein the reduced volume flow zone is formed by at least one aperture.

10. A moisture absorber column according to claim 8 wherein the reduced volume flow zone is formed by at least one notch formed in an upper edge of the or each said conduit member.

11. A moisture absorber column according to claim 10 wherein the or each notch is formed as a square, rectangular or triangular shape.

12. A moisture absorber column according to claim 1 wherein the outer housing is formed by a cylindrical upright outer wall closed at an upper end and at a lower end by plate members through which the gas inlet and the gas outlet and the liquid inlet and the liquid outlet pass.

13. A moisture absorber column according to claim 12 wherein each partition member has an outer circumference conforming to an internal circumference of said cylindrical upright outer wall.

14. A moisture absorber column according to claim 1 wherein a coalescent filter is provided within the outer housing, the filter being located above the uppermost partition member through which gas must pass to reach the gas outlet.

15. A moisture absorber column according to claim 14 further including a minimum pressure valve arranged to receive gas from said gas outlet.

16. A moisture absorber column according to claim 15 wherein the minimum pressure valve is mounted from said outer housing.

17. A pressurized gas receiving vessel arranged to receive and temporarily store compressed gas including a moisture absorber column mounted within the receiving vessel, said moisture absorbing column including an outer housing defining a vertically-disposed moisture absorption zone for absorbing moisture from a gas, a plurality of vertically-spaced partition members traversing the moisture absorption zone and each having a plurality of gas flow openings formed therein, at least one conduit member extending through an aperture in each said partition member to have a first portion extending upwardly from the partition member and a second portion extending downwardly towards the next adjacent said partition member located below said partition member, the conduit member having a liquid flow control device at or adjacent a lower end arranged to allow liquid flow from within the conduit member across the partition member located beneath said conduit member, said moisture absorber column having a liquid inlet arranged to deliver liquid to the uppermost said partition member and a liquid outlet to withdraw liquid from a region below the lowermost said partition member, a gas inlet arranged to deliver the gas to the region below the lowermost said partition member whereby said gas flows upwardly through the gas flow openings formed therein, and a gas outlet arranged to withdraw the gas from the moisture absorption zone above the uppermost said partition member.

18. A module for use in constructing a moisture absorber column, the module including a partition plate member having a plurality of spaced gas flow openings formed therein, and at least one conduit member extending through an aperture in the partition plate member whereby a first portion extends upwardly from the partition plate member and a second portion extends downwardly below the partition plate member, the second portion having a closed lower end with one or more liquid flow openings located at or adjacent the closed lower end, the or each said conduit member having a reduced volume flow zone formed at or adjacent an upper end thereof.

19. A module according to claim 18 wherein the reduced volume zone is formed by at least one aperture located adjacent the upper end of the conduit member.

20. A module according to claim 18 wherein the reduced volume zone is formed by at least one notch formed in an upper edge of the or each said conduit member.

21. A gas compressor system including a driven gas compressor arranged to receive gas to be compressed and discharge compressed gas therefrom, said compressed gas being passed to a moisture absorber column including an outer housing defining a vertically-disposed moisture absorption zone for absorbing moisture from a gas, a plurality of vertically-spaced partition members traversing the moisture absorption zone and each having a plurality of gas flow openings formed therein, at least one conduit member extending through an aperture in each said partition member to have a first portion extending upwardly from the partition member and a second portion extending downwardly towards the next adjacent said partition member located below said partition member, the conduit member having a liquid flow control device at or adjacent a lower end arranged to allow liquid flow from within the conduit member across the partition member located beneath said conduit member, said moisture absorber column having a liquid inlet arranged to deliver liquid to the uppermost said partition member and a liquid outlet to withdraw liquid from a region below the lowermost said partition member, a gas inlet arranged to deliver the gas to the region below the lowermost said partition member whereby said gas flows upwardly through the gas flow openings formed therein, and a gas outlet arranged to withdraw the gas from the moisture absorption zone above the uppermost said partition member.

22. A compressed gas drier including a moisture absorber column arranged to receive compressed gas to be dried from a gas compressor and deliver said compressed gas to a gas inlet of the moisture absorber column, said moisture absorber column including an outer housing defining a vertically-disposed moisture absorption zone for absorbing moisture from a gas, a plurality of vertically-spaced partition members traversing the moisture absorption zone and each having a plurality of gas flow openings formed therein, at least one conduit member extending through an aperture in each said partition member to have a first portion extending upwardly from the partition member and a second portion extending downwardly towards the next adjacent said partition member located below said partition member, the conduit member having a liquid flow control device at or adjacent a lower end arranged to allow liquid flow from within the conduit member across the partition member located beneath said conduit member, said moisture absorber column having a liquid inlet arranged to deliver liquid to the uppermost said partition member and a liquid outlet to withdraw liquid from a region below the lowermost said partition member, the gas inlet being arranged to deliver the gas to the region below the lowermost said partition member whereby said gas flows upwardly through the gas flow openings formed therein, and a gas outlet arranged to withdraw the gas from the absorption zone above the uppermost said partition member, said liquid outlet communicating with a moisture stripping column through which the liquid discharged from said moisture absorber column is passed with moisture picked up by said liquid being at least partially stripped from said liquid by a part of the dry compressed gas flow exiting the gas outlet of the moisture absorber column being diverted through said moisture stripping column, the liquid after passing through said moisture stripping column being delivered to the liquid inlet of the moisture absorber column.

23. A gas compressor system including a driven gas compressor adapted to receive gas to be compressed and discharge compressed gas therefrom, said discharged compressed gas being delivered to a moisture absorber configured to receive and circulate therethrough a fluid capable of removing moisture from the compressed gas prior to the compressed gas being discharged as a dry compressed gas through a filter to remove any remaining said fluid therefrom, said fluid being circulated through a circuit including a moisture stripper adapted to receive a portion of the dry compressed gas discharged from the moisture absorber and passing said portion of the dry compressed gas in moisture exchange relationship with said fluid prior to reintroducing said fluid into said moisture absorber, said fluid being heated by a fluid heating arrangement after leaving said moisture absorber and before entering said moisture stripper.

24. A gas compressor system according to claim 23 wherein the fluid has hygroscopic characteristics.

25. A gas compressor system according to claim 23 wherein the fluid heating arrangement for heating the fluid includes a heat exchanger arranged to exchange heat with a hot region of said driven gas compressor prior to the fluid entering said moisture stripper.

26. A gas compressor system according to claim 25 wherein the driven gas compressor is a rotary compressor arrangement including a compressor unit receiving said gas to be compressed and a liquid lubricant with the compressed gas and entrained liquid lubricant being delivered to and at least partially separated in a separator zone, the liquid lubricant being recirculated from the separator zone to the compressor unit, said heat exchanger exchanging heat with at least one of a region of hot compressed gas discharged from the driven gas compressor and a region of hot liquid lubricant being returned to the compressor unit.

27. A gas compressor system according to claim 23 wherein the fluid heating arrangement includes an independent heater provided to heat said fluid before entering said moisture stripper.

28. A gas compressor system according to claim 23 wherein the discharged compressed gas from said driven gas compressor is passed initially through a first cooler device to condense at least a portion of the moisture carried by the compressed gas which is collected and removed from the compressed gas flow prior to entering said moisture absorber.

29. A gas compressor system according to claim 23 wherein the driven gas compressor, the moisture absorber and the moisture stripper are mounted on a common support platform.

30. A gas compressor system according to claim 23 wherein the driven gas compressor is mounted on a support platform separate to at least one of the moisture absorber and the moisture stripper.

31. A gas compressor system including a driven gas compressor adapted to receive gas to be compressed and discharge compressed gas therefrom, said discharged compressed gas being delivered to a moisture absorber configured to receive and circulate therethrough a fluid capable of removing moisture from the compressed gas prior to the compressed gas being discharged as a dry compressed gas through a filter to remove any remaining said fluid therefrom, said fluid being circulated through a circuit including a moisture stripper adapted to receive a portion of the dry compressed gas discharged from the moisture absorber and passing said portion of the dry compressed gas in moisture exchange relationship with said fluid prior to reintroducing said fluid into said moisture absorber, said fluid being cooled by a cooling device after leaving said moisture stripper and before entering said moisture absorber.

32. A gas compressor system according to claim 31 wherein the fluid has hygroscopic characteristics.

33. A gas compressor system according to claim 31 wherein the fluid is heated by a fluid heating arrangement after leaving said moisture absorber and before entering said moisture stripper.

34. A gas compressor system according to claim 33 wherein the fluid heating arrangement includes a heat exchanger arranged to exchange heat with a hot region of said driven gas compressor before entering the moisture stripper.

35. A gas compressor system according to claim 31 wherein the discharged compressed gas from said driven gas compressor is passed initially through a first cooler device to condense at least a portion of the moisture carried by the compressed gas which is collected and removed from the compressed gas flow prior to entering said moisture absorber.

36. A gas compressor system according to claim 31 wherein the driven gas compressor, the moisture absorber and the moisture stripper are mounted on a common support platform.

37. A gas compressor system according to claim 31 wherein the driven gas compressor is mounted on a support platform separate to at least one of the moisture absorber and the moisture stripper.

38. A drier for drying compressed gas, said drier being adapted to receive compressed gas to be dried from a gas compressor, the compressed gas being delivered to a moisture absorber configured to receive and circulate therethrough a fluid capable of removing moisture from the compressed gas prior to the compressed gas being discharged as a dry compressed gas through a filter to remove any remaining said fluid therefrom, said fluid being circulated through a circuit including a moisture stripper adapted to receive a portion of the dry compressed gas discharged from the moisture absorber and passing said portion of the dry compressed gas in moisture exchange relationship with said fluid prior to reintroducing said fluid into said moisture absorber, said fluid being heated with a fluid heating arrangement after leaving said moisture absorber and before entering said moisture stripper.

39. A drier according to claim 38 wherein the fluid has hygroscopic characteristics.

40. A drier according to claim 38 wherein the fluid heating arrangement includes a heat exchanger arranged to exchange heat with a hot region of the gas compressor.

41. A drier for drying compressed gas, said drier being adapted to receive compressed gas to be dried from a gas compressor, the compressed gas being delivered to a moisture absorber configured to receive and circulate therethrough a fluid capable of removing moisture from the compressed gas prior to the compressed gas being discharged as a dry compressed gas through a filter to remove any remaining said fluid therefrom, said fluid being circulated through a circuit including a moisture stripper adapted to receive a portion of the dry compressed gas discharged from the moisture absorber and passing said portion of the dry compressed gas in moisture exchange relationship with said fluid prior to reintroducing said fluid into said moisture absorber, said fluid being heated by a fluid heating arrangement after leaving said moisture absorber and before entering said moisture stripper, said fluid being cooled by a cooling device after leaving said moisture stripper and before entering said moisture absorber.

42. A drier according to claim 41 wherein the fluid heating arrangement includes a heat exchanger arranged to exchange heat with a hot region of the gas compressor.

43. A drier according to claim 41 wherein the cooling device includes a heat exchanger arranged to transfer heat from said fluid to an air flow.

44. A drier according to claim 38 wherein the moisture absorber includes a column having an outer housing defining a vertically-disposed moisture absorption zone for absorbing moisture from a gas, a plurality of vertically-spaced partition members traversing the moisture absorption zone and each having a plurality of gas flow openings formed therein, at least one conduit member extending through an aperture in each said partition member to have a first portion extending upwardly from the partition member and a second portion extending downwardly towards the next adjacent said partition member located below said partition member, the conduit member having a liquid flow control device at or adjacent a lower end arranged to allow liquid flow from within the conduit member across the partition member located beneath said conduit member, said column having a liquid inlet arranged to deliver liquid to the uppermost said partition member and a liquid outlet to withdraw liquid from a region below the lowermost said partition member, a gas inlet arranged to deliver the gas to the region below the lowermost said partition member whereby said gas flows upwardly through the gas flow openings formed therein, and a gas outlet arranged to withdraw the gas from the moisture absorption zone above the uppermost said partition member.

45. A drier according to claim 41 wherein the moisture absorber includes a column having an outer housing defining a vertically-disposed moisture absorption zone for absorbing moisture from a gas, a plurality of vertically-spaced partition members traversing the moisture absorption zone and each having a plurality of gas flow openings formed therein, at least one conduit member extending through an aperture in each said partition member to have a first portion extending upwardly from the partition member and a second portion extending downwardly towards the next adjacent said partition member located below said partition member, the conduit member having a liquid flow control device at or adjacent a lower end arranged to allow liquid flow from within the conduit member across the partition member located beneath said conduit member, said column having a liquid inlet arranged to deliver liquid to the uppermost said partition member and a liquid outlet to withdraw liquid from a region below the lowermost said partition member, a gas inlet arranged to deliver the gas to the region below the lowermost said partition member whereby said gas flows upwardly through the gas flow openings formed therein, and a gas outlet arranged to withdraw the gas from the moisture absorption zone above the uppermost said partition member.

* * * * *